R. W. KING & H. G. MILLER.
EVAPORATOR.
APPLICATION FILED APR. 14, 1917.
1,254,606.
Patented Jan. 22, 1918.
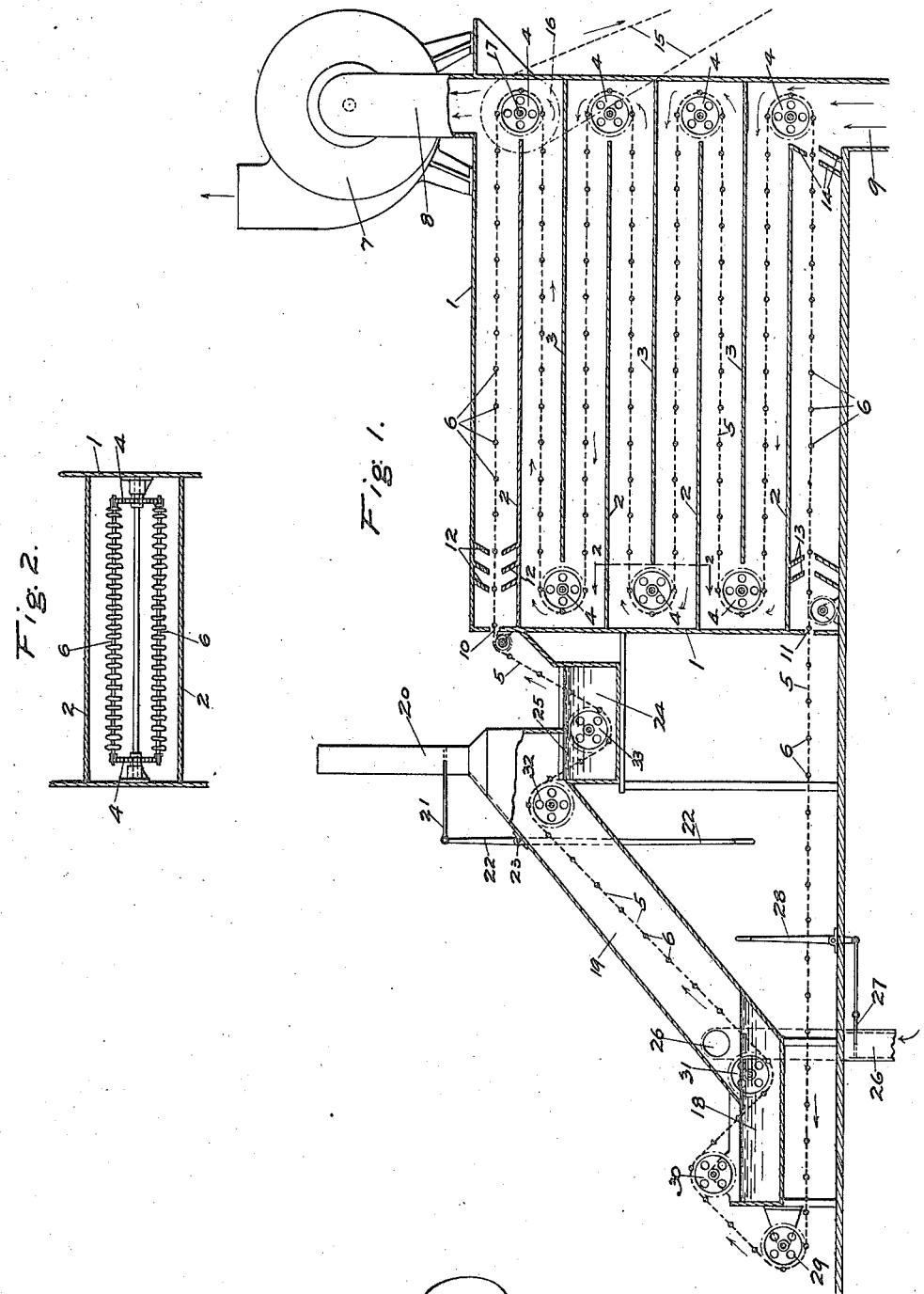

UNITED STATES PATENT OFFICE.

RALPH W. KING AND HERBERT G. MILLER, OF THE DALLES, OREGON; SAID KING ASSIGNOR TO SAID MILLER.

EVAPORATOR.

1,254,606. Specification of Letters Patent. Patented Jan. 22, 1918.

Application filed April 14, 1917. Serial No. 162,163.

*To all whom it may concern:*

Be it known that we, RALPH W. KING and HERBERT G. MILLER, citizens of the United States, residing in The Dalles, county of Wasco, and State of Oregon, have invented certain new and useful Improvements in Evaporators, of which the following is a specification.

Our invention relates to evaporators, and more particularly to evaporators adapted for drying sliced fruit, vegetables and the like, which can be strung upon rods and carried through a circuitous course through an evaporator structure, means also being provided for subjecting said matter to be dried to a bleaching process and to a bath during its course of travel and before it enters the drying chamber.

In order to clearly explain our invention we have illustrated the same in the accompanying sheet of drawings, which we will now describe.

Figure 1 represents a vertical longitudinal sectional view through an evaporator embodying our invention;

Fig. 2 is a vertical cross sectional view taken on line 2—2 of Fig. 1.

Referring now in detail to the drawings, our invention comprises a vertical housing 1, provided with floor structures 2—2 and 3—3 therein, the floor structures 2—2, being attached to the left hand end of the housing and spaced from the right hand end thereof, while the floor structures 3—3 are attached to the right hand end of said housing and are spaced from the left hand end thereof, as clearly shown in Fig. 2, said floor structures comprising in effect a series of baffle plates extending longitudinally of said housing and providing a circuitous course of travel therethrough. Mounted in the opposite ends of said housing at the ends of the floor structures 2—2 and 3—3, are guide pulleys, or sprocket wheels 4—4. Mounted to travel around said guide pulleys, or sprocket wheels, from one to the other, between said floor structures, or baffle plates 2—2 and 3—3, and at the opposite sides of said housing, are traveling conveyer chains 5—5, adapted to receive therebetween carrying rods 6—6, on which sliced or cut fruit or vegetables is strung, as indicated clearly in Fig. 2.

A fan 7, is mounted upon the upper side of the housing 1, and is connected with said housing as by means of a pipe 8, whereby to cause an upward circulation through said housing, as indicated by the arrows, said housing being provided at its lower side with an air inlet 9.

At the left hand end of said housing are entrance and exit openings, designated 10 and 11, respectively, through which said traveling conveyer 5, and the matter to be dried, carried thereby, enters and leaves said housing. A series of projecting baffle plates 12, are arranged adjacent the inlet opening 10, to prevent excess circulation of air into the housing through the inlet 10 for the conveyer, while similar baffle plates 13, are arranged near the exit for said conveyer to prevent undue circulation of air through said exit. Baffle plates 14 are also provided near the air inlet 9, for the same purpose.

Said traveling conveyer may be driven from any suitable source of power, as by means of a belt or chain 15, indicated in dotted lines in Fig. 1, and running over a driving pulley, or sprocket, 16, also indicated in dotted lines and mounted upon the outer end of one of the upper shafts 17, upon which the guide pulleys or sprocket wheels 4 are mounted.

Before passing said matter to be dried through the drying housing, in the manner just described, it is first subjected to a bleaching treatment, which we will now describe.

Constructed at the end of the housing 1, is a reservoir 18, from which extends upwardly in an inclined manner a pipe, or conduit, 19, terminating at its upper end in a flue 20, provided with a damper 21, adapted to be opened and closed by means of a lever 22, pivoted upon said pipe, or conduit, as at 23. Also at the upper end of said pipe, or conduit, is a second reservoir 24. Said reservoirs 18 and 24 operate as seals for closing the lower end of said pipe, or conduit, 19, and also for closing an upper outlet therefrom, as at 25, at its upper end, for a purpose now to be described. Leading to said pipe, or conduit, 19, is a supply pipe 26, provided with a damper 27, operated by means of a lever 28, said supply pipe being adapted to supply said conduit 19, with a sulfur gas, or other bleaching matter, which is sealed in said pipe, or conduit, 19, by the reservoirs 18 and 24, when the damper 21 is closed.

The traveling conveyer 5, runs successively over guide pulleys, or sprocket wheels, 29, 30, 31, 32 and 33, thus carrying the conveyer and the matter to be treated down through the bath in the reservoir 18, thence upwardly through the pipe, or conduit, 19, in which it is subjected to the bleaching treatment therein, after which it is carried through the bath in the reservoir 24, and thence through the entrance opening 10, into the drier housing 1, and through the circuitous course of travel therethrough, in the manner before described. The rods 6 on which the matter to be dried is strung can be lifted from the conveyer 5, at any convenient point between the exit 11, from the drier housing 1, and the reservoir 18, and other rods with fresh matter to be dried substituted therefor, it being understood, of course, that these carrier rods for the matter to be dried are easily and quickly detachable in any suitable manner from the traveling conveyer. In order to change the bleaching matter in the pipe, or conduit, 19, it is only necessary to open the damper 21, and allow it to escape through the flue 20, as a fresh supply is admitted by opening the damper 27 in the supply pipe 26.

Thus by means of our improved evaporator, sliced fruit or vegetables can be treated to a bleaching process and thence to a drying process, all carried on as a continuous operation, and while we are aware that changes can be made in the embodiment of our invention as shown for purposes of illustration, without departing from the spirit thereof, we do not limit said invention to the exact embodiment thereof, except as we may be limited by the hereto appended claims.

We claim:

1. In a device of the character referred to, in combination, a drier chamber with means for causing a circulation of air therethrough, a bleaching chamber, or conduit, with reservoir sealing means at its inlet and outlet, a traveling conveyer arranged to travel through said drier chamber and through said bleaching chamber, means being provided for dipping said traveling conveyer through said sealing reservoirs at the inlet and outlet to said bleaching chamber, and means for supporting matter to be dried on said travel conveyer, substantially as described.

2. In a device of the character referred to, a housing with baffle members therein, means for causing the circuitous circulation of air therethrough, a traveling conveyer with means for directing the same through said circuitous course in said housing, means for supporting matter to be dried on said traveling conveyer, a separate chamber, or conduit, for treating the matter to be dried before it enters said drier housing, and means for directing said traveling conveyer through said treating chamber, or conduit, before it enters said drier, substantially as described.

3. In a drying apparatus of the character referred to, a housing with oppositely projecting baffle members therein, means for causing a circuitous circulation of air therethrough, a traveling conveyer with means for carrying the same through said circuitous course within said housing, supporting rods adapted to receive sliced or cut matter to be dried, carried by said conveyer, a bleaching conduit with means for directing said conveyer and the matter to be dried therethrough, reservoirs with liquid therein forming sealing means for the inlet and outlet of said bleaching chamber, and means for carrying said conveyer through the liquid as it enters and leaves said bleaching chamber, substantially as described.

4. In a drying apparatus of the character referred to, a housing with oppositely projecting baffle members therein, means for causing a circuitous circulation of air therethrough, a traveling conveyer with means for carrying the same through said circuitous course within said housing, supporting rods adapted to receive sliced or cut matter to be dried, carried by said conveyer, a bleaching conduit with means for directing said conveyer and the matter to be dried therethrough, reservoirs with liquid therein forming sealing means for the inlet and outlet of said bleaching chamber, means for carrying said conveyer through the liquid as it enters and leaves said bleaching chamber, and means for changing the bleaching matter in said bleaching conduit independently of said reservoir sealing means, substantially as described.

Signed at The Dallas, Wasco county, Oregon, this 7th day of April, 1917.

RALPH W. KING.
HERBERT G. MILLER.

In the presence of—
BEN R. LITFIN,
C. HEDGES.